United States Patent [19]

Wakabayashi et al.

[11] 4,342,509
[45] Aug. 3, 1982

[54] FILM FEEDING DEVICE OF A CAMERA

[75] Inventors: Hiroshi Wakabayashi, Yokohama; Takeshi Okuyama, Kawasaki, both of Japan

[73] Assignee: Nippon Kogaku K.K., Tokyo, Japan

[21] Appl. No.: 195,431

[22] Filed: Oct. 9, 1980

[30] Foreign Application Priority Data

Oct. 13, 1979 [JP] Japan ............................. 54-132171
Oct. 13, 1979 [JP] Japan ............................. 54-132174

[51] Int. Cl.³ .............................................. G03B 1/12
[52] U.S. Cl. ................................... 354/173; 354/214
[58] Field of Search .............. 354/170, 171, 275, 173, 354/217, 218, 212–215, 202, 204, 205, 206

[56] References Cited

U.S. PATENT DOCUMENTS

| 651,118 | 6/1900 | Pascal et al. | 354/214 |
| 3,126,803 | 3/1964 | Hintze | 354/173 |
| 3,762,291 | 10/1973 | Kimura et al. | 354/171 |
| 3,882,516 | 5/1975 | Ogiso et al. | 354/173 |
| 3,925,798 | 12/1975 | Sanada et al. | 354/212 X |
| 3,995,292 | 11/1976 | Kondo | 354/173 |
| 4,162,837 | 7/1979 | Haragushi | 354/170 X |
| 4,229,091 | 10/1980 | Date et al. | 354/173 |

FOREIGN PATENT DOCUMENTS 1325437  3/1963  France .............................. 354/173

Primary Examiner—Donald A. Griffin
Attorney, Agent, or Firm—Fitzpatrick, Cella, Harper & Scinto

[57] ABSTRACT

In a film feeding device of a camera including a preparatory wind-up device for winding up on a supply spool, before exposure, a roll film in a film magazine loaded into the camera, and a second wind-up device for rewinding into the magazine the unexposed film wound on the supply spool, there is provided means for detecting the completion of the wind-up, by the preparatory wind-up device, of all of the film which is drawn out of the film magazine and can be wound up on the supply spool, and change-over means for blocking and releasing the operation of the second wind-up device.

8 Claims, 12 Drawing Figures

FILM FEEDING DEVICE OF A CAMERA

BACKGROUND OF THE INVENTION

1. Field of the Invention

This invention relates to a film feeding device of the type in which, prior to photography, unexposed film is drawn out of a film magazine and taken up on a wind-up shaft in advance and the film is wound into the film magazine during each cycle of photography.

2. Description of the Prior Art

In picture-taking, even beginners commonly know that photography can be accomplished by operating a film advance lever to feed the film, and then depressing a release button. However, as regards the film loading or the film rewind, the insufficient knowledge of the operation therefor on the part of beginners has often given rise to an undesirable result that unexposed film or photographed film is exposed to the sun. To avoid this, U.S. Pat. No. 3,925,798 discloses a film feeding device in which, after the film loading, unexposed film is first drawn out of the film magazine and taken up on the wind-up shaft in advance and the film is wound into the magazine during each cycle of photography. This device is useful in eliminating the necessity of the film rewind operation, but it has the undesirable possibility that before the preparatory wind-up of unexposed film is completed, namely, with the film still remaining in the film magazine, photography is started, whereby a prescribed number of photographed frames cannot be obtained. As a countermeasure for this, the prior art has proposed the technique of effecting the preparatory wind-up while confirming the amount of wind-up by means of a film counter, but this is very cumbersome in operation and is not preferable.

SUMMARY OF THE INVENTION

It is an object of the present invention to provide an improved film feeding device of the described type which ensures the film loading operation for the preparation for photography.

It is another object of the present invention to provide an improved film feeding device for automatically effecting the preparatory wind-up and enabling the subsequent photographing operation to occur smoothly.

The invention will become fully apparent from the following detailed description thereof taken in conjunction with the accompanying drawings.

DESCRIPTION OF THE PREFERRED EMBODIMENTS

Figure 1:
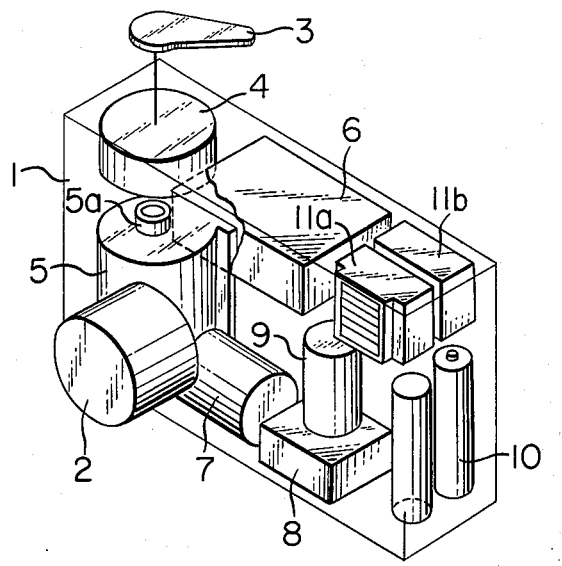
FIG. 1 is a perspective view showing the structure of a camera provided with the device of the present invention.

The invention will hereinafter be described with respect to embodiments thereof. In the following description, it is to be understood that the words "preparatory wind-up" means pre-drawing out the film from a film magazine and winding up the film on a take-up spool and that the simple word "wind-up" means that the film taken up in advance onto the take-up spool is again wound into the film magazine for photography. Referring to FIG. 1 which schematically illustrates the structure of the present invention, on the right-hand side as viewed from the back of a camera body 1, there are disposed a film advance lever 3, a manual wind-up mechanism 4 operatively associated with the film advance lever 3 and operative to wind up the film, and a magazine chamber (not shown) for containing a film magazine 5 therein. The manual wind-up mechanism 4 has a drive coupling (not shown) engageable and disengageable with the winding shaft 5a of the film magazine 5. On the left-hand side as viewed from the back of the camera body 1, there are disposed a motor-containing type take-up spool 9 across an aperture, a reduction gear for reducing the speed of rotation of the motor and rotating the take-up spool 9, and a device 8 for making and breaking the operative association between the motor and the spool 9 during the preparatory wind-up and during the wind-up. Further, a power supply battery 10 is disposed parallel to the take-up spool 9, and the light-emitting portion 11a and control circuit 11b of a flash-emitting unit (these will hereinafter be referred to as the flash-emitting unit) are disposed above the take-up spool 9. In the upper portion of the aperture, namely, between the manual wind-up mechanism 4 and the flash-emitting unit, there is disposed a range finder type finder 6, and in the lower portion of the aperture, namely, between the magazine chamber and the reduction gear 8, there is disposed a capacitor 7 for the flash-emitting unit. A lens barrel 2 contains therein a lens shutter device (not shown).

The outline of the operation of this structure is as follows: First, the back lid of the camera is opened and the film magazine 5 is placed into the magazine chamber, and then the leader portion of the film is placed at a predetermined position on the take-up spool 9. When the back lid is closed, the take-up spool 9 is rotated by the motor and as a result, preparatory wind-up of the unexposed film is effected. The rotation of the winding shaft 5a of the film magazine 5 at this time is not transmitted to the film advance lever 3 side by the reason of reduction in motor load. When the preparatory wind-up is terminated, the motor stops automatically, whereafter there is established the operative association between the film advance lever 3 and the winding shaft 5a. Thus, the preparation for photography is completed and the photographer, if he sequentially winds up the film by operating the film advance lever 3, can proceed with photography while winding up the exposed film into the film magazine 5.

An embodiment of the present invention will be described in detail with reference to FIGS. 2 to 7.

Figure 2:
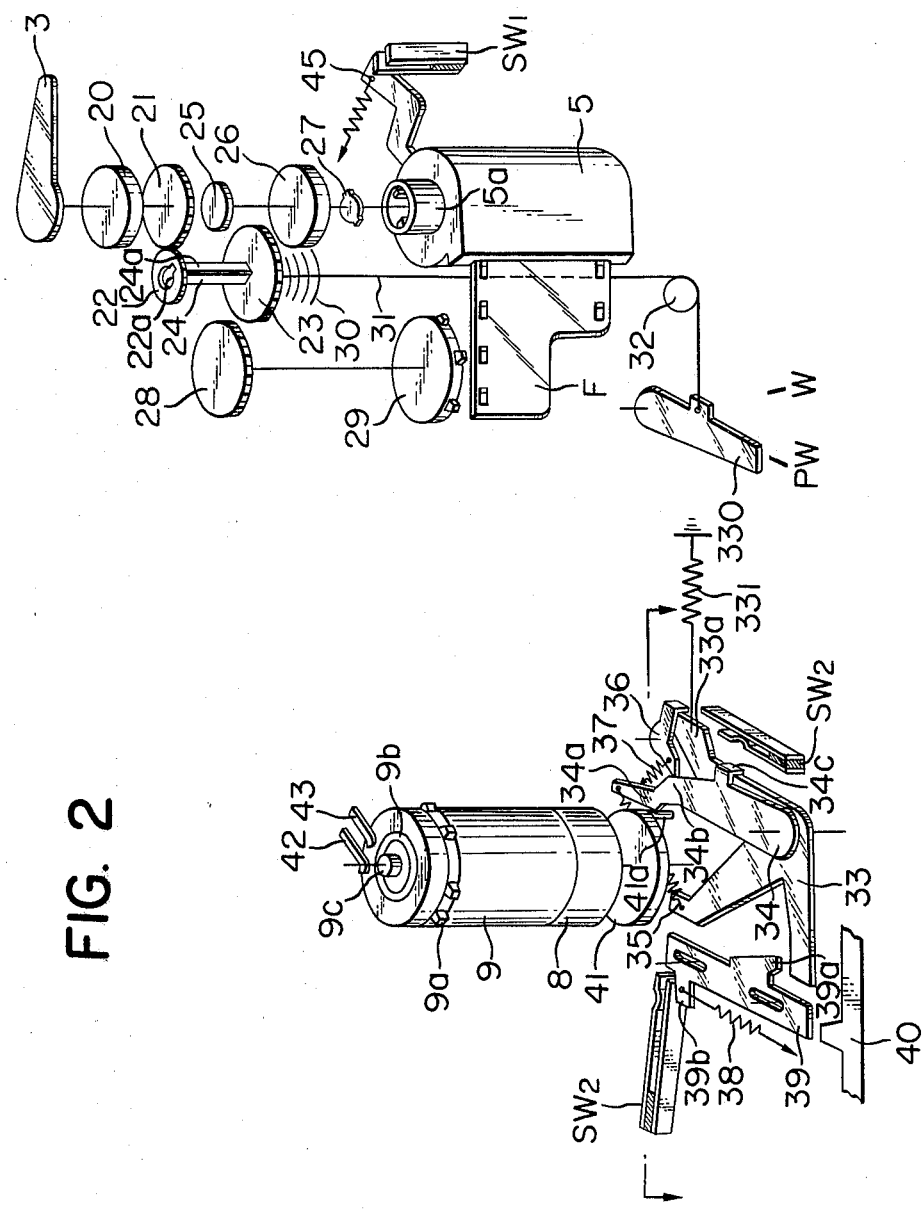
FIG. 2 is a perspective view of an embodiment of the present invention.

Referring to FIG. 2, the film advance lever 3 is connected to a gear 21 through a device 20 having a wind-up ratchet, a shutter charge mechanism, a dual exposure preventing mechanism, etc. which are known per se. A rotatably supported gear 22 meshes with the gear 21 and is formed with a hole having a key groove 22a. A gear 23 is integral with a shaft 24 having a key 24a, and is slidable in axial direction (vertical direction in FIG. 2). Thus, the gears 22, 23 and shaft 24 together constitute a clutch. The rotation of the gear 23 is transmitted, on the one hand, to a drive coupling 27 through an intermediate mechanism 26 having a gear 25, a friction clutch, etc. and on the other hand, to a sprocket 29 through a gear 28.

A spring 30 for upwardly biasing the gear 23 is disposed below the gear 23. A cord 31 connects the gear 23 and a change-over operation lever 330 through a pulley 32. This lever 330 is rotatable between a position corresponding to an index mark PW and a position corresponding to an index mark W, and when in the former position, it pulls the cord 31 to downwardly pull the gear 23 against the force of the spring 30 and is restrained at that position by a restraining member, not shown.

A lever 33 is connected to a spring 331. The lever 33 is coaxial with a torque detecting lever 34, and a compression spring 35 is provided between the levers 33 and 34. A restraining lever 36 clockwisely biased by a spring 37 acts to prevent rotation of the lever 33. A slide lever 39 downwardly biased by a spring 38 acts to detect the opening-closing of the back lid 40 of the camera.

The take-up spool 9 utilizes the outer periphery of the casing of the motor, and pawls 9a for engaging the perforations of the film are projectedly provided on the outer periphery of this casing. The motor is electrically energized through brushes 42 and 43 which are in contact with an electrode 9b. A speed reduction mechanism 8 utilizing a planetary mechanism is provided integrally with the casing of the motor, namely, the take-up spool 9, to reduce the speed of rotation of the motor. A torque plate 41 to which the rotation of the motor is transmitted through the speed reduction mechanism 8 has a pin 41a. The projection 34a of the torque detecting lever 34 can enter into the rotational orbit of this pin 41a.

A film presence detecting switch $SW_1$ is closed by clockwise rotation of a lever 45 when the film magazine 5 has been loaded into the magazine chamber, and is opened by counter-clockwise retraction of the lever 45 when the film magazine 5 is not loaded into the magazine chamber. A switch $SW_2$ operatively associated with the back lid is closed upon closing of the back lid and is opened upon opening of the back lid. A torque detecting switch $SW_3$ is a normally closed switch and is opened by clockwise rotation of the lever 33.

Figure 6:
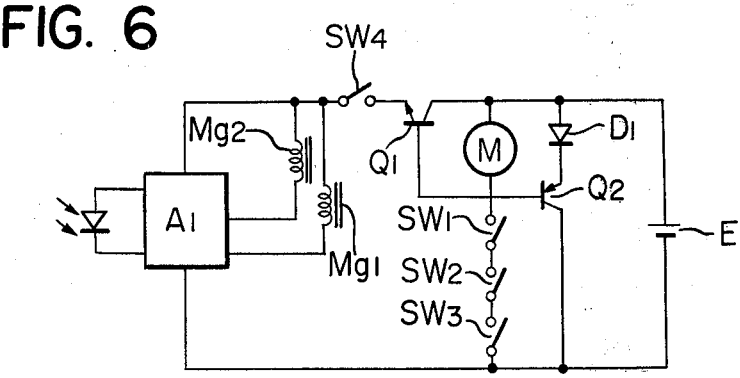
FIG. 6 is a diagram of the electric circuit for the embodiment.

Referring to FIG. 6, the switches $SW_1$–$SW_3$ are series-connected to the motor M which itself forms the take-up spool 9. A switching transistor $Q_1$ and a release switch $SW_4$ are series-connected in the power supply circuit from a power source E to an electromagnetic release and automatic exposure control circuit $A_1$. An electromagnet $Mg_1$ acts for electromagnetic release. An electromagnet $Mg_2$ is an electromagnetic member for controlling the shutter or the aperture and when energized, it effects the closing of the shutter or the prevention of the stop-down. A transistor $Q_2$ controls a light-emitting diode $D_1$ and displays whether or not the film is in preparatory wind-up.

In FIG. 2, the lever 33 is designed to be displaced in response to the opening-closing of the back lid 40, but such construction is not restrictive. For example, the lever 33 has been described as being restrained by the restraining lever 36, but since the movement of the lever 33 by the spring 331 should only be prevented, the lever 33 may also be designed to be manually operated into its restrained condition.

Figure 3:
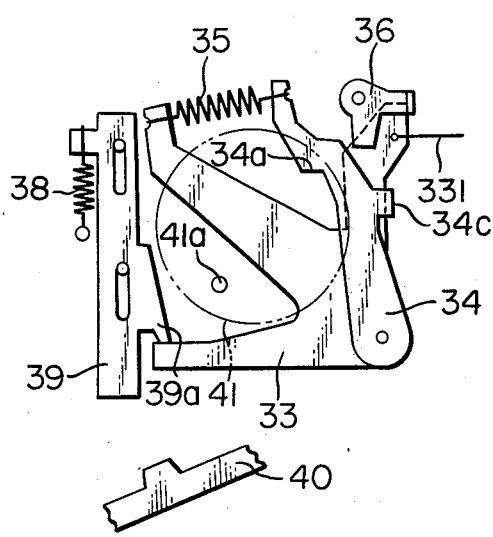
FIGS. 3 to 5 are enlarged views of the portion as seen along the arrows of FIG. 2.
Figure 4:
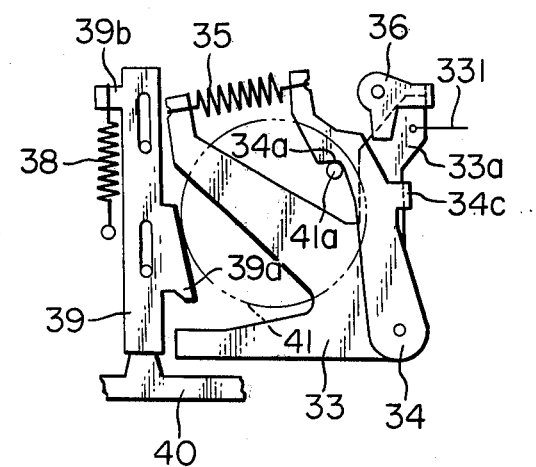
Figure 5:
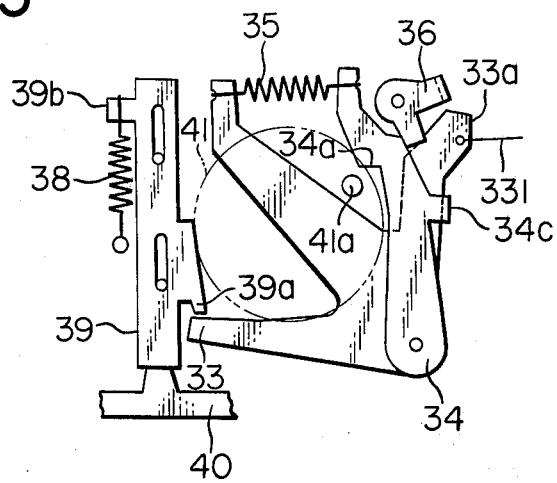

Reference is now had to FIGS. 3–5 in addition to FIGS. 2 and 6 to describe the operation of the present embodiment in accordance with the operational sequence.

(1) Opening of the back lid for the film loading: When the back lid 40 is opened from the position of FIG. 5, the slide lever 39 is slides downwardly by action of the spring 38. As a result, the lever 33 is counter-clockwisely rotated by the arm portion 39a of the slide lever and the switch $SW_2$ is opened (the condition of $t_2$ in FIG. 7). At the same time, the torque detecting lever 34 is also rotated counter-clockwisely by the action of the spring 35 and the projection 34a thereof advances into the rotational orbit of the pin 41a. After having let the lever 33 rotate counter-clockwisely, the restraining lever 36 is clockwisely rotated by the spring 37 and comes into engagement with one end 33a of the lever 33 to thereby restrain the lever 33. The spring 331 is charged by the rotation of the lever 33, and this charge is retained by the lever 36 restraining the lever 33.

After the back lid 40 has been opened, the lever 330 is clockwisely rotated from the position corresponding to the index mark W to the position corresponding to the index mark PW. By this, the cord 31 pulls the gear 23 downwardly. Accordingly, the key and key groove connection between the gear 22 and the gear 23 is broken. At this time, the spring 30 stores therein the bias force for forcing the gear 23 upwardly. Part of the condition at this time is shown in FIG. 3.

Figure 7:
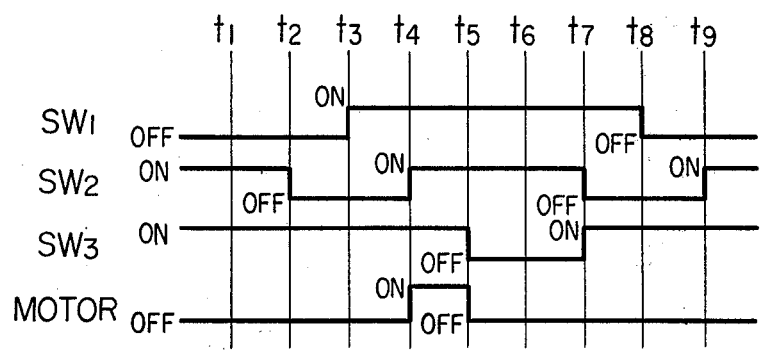
FIG. 7 is a timing chart illustrating the operation of the embodiment.

Next, when the film magazine 5 is loaded into the magazine chamber in such a manner that the winding shaft 5a is coupled to the drive coupling 27, the lever 45 is rightwardly turned by the outer wall of the film magazine 5 to close the switch $SW_1$ ($t_3$ in FIG. 7). Then, the film F is drawn out of the film magazine 5 and the leader portion thereof is placed on the take-up spool 9. At this time, the perforations of the film F must be engaged with the sprocket 29 and the pawls 9a of the take-up spool 9.

(2) Closing of the back lid and preparatory wind-up: Now, when the back lid 40 is closed from this state, the slide lever 39 slides upwardly against the force of the spring 38 and the other arm portion 39b thereof closes the switch $SW_2$ ($t_4$ in FIG. 7). The lever 33 is somewhat turned rightwardly at the initial stage of the return of the slide lever 39, but it is restrained by the restraining lever 36 and finally settles down in the position shown in FIGS. 2 and 4. The switch $SW_3$ remains closed. At this time, the lever 33 has its biased direction changed over to the clockwise direction by the spring 331. As regards the electric circuit at this time, the switches $SW_1$–$SW_3$ are all closed in FIGS. 6 and 7 and therefore, the motor M is supplied with power from the power source E and is rotated. At the same time, transistor $Q_1$ is turned off and transistor $Q_2$ is turned on. When the transistor $Q_1$ is in its OFF state, the circuit $A_1$ is not operated even if a release switch $SW_4$ is closed and thus, the electromagnetic release by the electromagnet $Mg_1$ is prevented. When the transistor $Q_2$ is in its ON state, the light-emitting diode $D_1$ is turned to display the rotation of the motor M, namely, the preparatory wind-up condition of the film.

Turning back to FIG. 2, the relation between the rotation of the motor M and the preparatory wind-up of the film will be described. As previously described, the projection 34a of the torque detecting lever 34 has entered into the rotational orbit of the pin 41a of the torque plate 41 and therefore, with the rotation of the motor M, the pin 41a engages the projection 34a. The time when this engagement occurs differs depending on the initial position of the pin 41a, but is never longer than the time required for the torque plate 41 to make one full rotation. During this engagement, the rotation of the torque plate 41 is prevented by the action of the bias force of the spring 35 and therefore, the planetary mechanism in the speed reduction mechanism 8 is operated and the casing 9 of the motor M is rotated clockwisely. As a result, the film F, whose perforations are engaged with the pawls 9a, is taken up. At this time, the sprocket 29 and the drive coupling 27 are free to rotate because the clutch is disengaged, and they do not impose any load on the motor M.

(3) Termination of preparatory wind-up: When the preparatory wind-up proceeds and all of the film has been taken up on the take-up spool 9, the end of the film F secured to the winding shaft 5a causes the load of the motor M to be increased and also causes the rotational torque to be increased correspondingly. When this rotational torque overcomes the bias force of the spring 35, the torque plate 41 drives away the torque detecting lever 34 and rotates. By this, the lever 34 is clockwisely rotated and the shoulder 34b thereof rotates the restraining lever 36 counter-clockwisely against the force of the spring 37, thus releasing the restraint of the lever 33. Thereupon, the lever 33 is rightwardly turned by the spring 331, as shown in FIG. 5, and the lever 34 is also turned rightwardly by the engagement between the bent portion 34c of the lever 34 and the lever 33, as a result of which the projection 34a is retracted out of the orbit of the pin 41a. This means that the load on the motor M through the pin 41a becomes null. By this rotation, one end 33a of the lever 33 opens the switch $SW_3$ and therefore, the power supply circuit to the motor M is cut off and the motor M stops rotating ($t_5$ in FIG. 7). Also, the transistor $Q_1$ is turned on to enable electromagnetic release and the subsequent exposure control, while the transistor $Q_2$ is turned off to turn off the light-emitting diode $D_1$, thus informing of the termination of the preparatory wind-up.

On the other hand, when the lever 330 is rotated so as to correspond to the index mark W after the turn-off of the light-emitting diode $D_1$, the gear 23 is connected to the gear 22 by the return of the spring 30 and the coupling between the key and the key groove and also meshes with the gears 25 and 28.

(4) Photography: When the film advance lever 3 is rotated, the rotation thereof is transmitted to the drive coupling 27 and sprocket 29 and an amount of film corresponding to one frame is wound into the film magazine. Thereafter, when a release button (not shown) is depressed, the release switch $SW_4$ of FIG. 6 is closed and the electromagnet $Mg_1$ is first energized to effect the release operation electromagnetically and subsequently, the shutter speed or the aperture value is adjusted to a predetermined value. If this operation is repeated, photography will proceed ($t_6$ in FIG. 7).

(5) Opening of the back lid for removing the exposed film: If the back lid 40 is opened when photography has been completed, the slide lever 39 slides downwardly from its position of FIG. 5 by the spring 38 to turn the lever 33 leftwardly again and open the switch $SW_2$ ($t_7$ in FIG. 7). When the completely photographed film magazine is removed out of the camera, the switch $SW_1$ is opened ($t_8$ in FIG. 7) and, when the back lid is closed, the switch $SW_2$ is closed ($t_9$ in FIG. 7), thus restoring the original condition.

The change-over operation lever 330 used in the above-described embodiment may be eliminated with the spring 331 by coupling the cord 31 directly to the lever 33. That is, if the bias force of the spring 38 is made sufficiently great as compared with the bias force of the spring 30, when the back lid is opened to permit film loading, the lever 33 is rotated by the spring 38 to move the gear 23 downwardly through the agency of the cord 31 and break the connection between the gear 22 and the gear 23 and at the same time, cause the spring 30 to accumulate a bias force therein. This condition is the same as the condition in which the change-over operation lever 330 corresponds to the index mark PW. The lever 33 release from the restraint by the restraining lever 36 counter-clockwisely rotated at the termination of the preparatory wind-up is rightwardly turned by the bias force accumulated in the spring 30 and simultaneously therewith, the connection between the gear 22 and the gear 23 is established. This condition is the same as the condition in which the change-over operation lever 330 corresponds to the index mark W.

Figure 8:
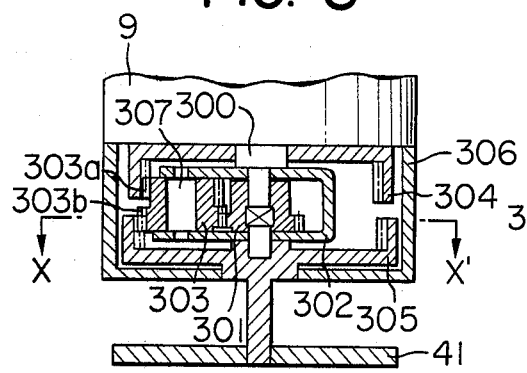
FIG. 8 is a fragmentary cross-sectional view of an embodiment of the speed reduction mechanism of the present invention.
Figure 9:
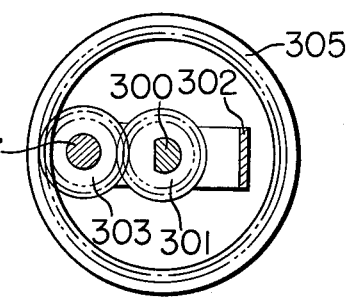
FIG. 9 is a sectional view taken along the line X—X' of FIG. 8.

FIGS. 8 and 9 show an embodiment of the speed reduction mechanism 8. The drive shaft 300 of the motor is engaged with a sun gear 301 to rotate the latter. A carrier 302 is rotatably supported on the shaft 300 and also rotatably supports a planet gear 303 meshing with the sun gear 301. The planet gear 303 has two teeth 303a and 303b, and one tooth 303a meshes with a first ring gear 304 and the other tooth 303b meshes with a second ring gear 305. The first ring gear 304 is integral with the casing 9 of the motor. The second ring gear 305 is rotatably supported by a case 306 for containing the speed reduction mechanism therein which is fixed to the casing 9, and is also rotatable relative to the shaft 300. The second ring gear 305 has fixed thereto the aforementioned torque plate 41.

Accordingly, if the rotation of the torque plate 41 is fixed, the planet gear 302 revolves around the inner periphery of the first and second ring gears 304 and 305 with the rotation of the sun gear 301. If, at this time, the second ring gear 305 is fixed, the first ring gear 304 rotates at a predetermined reduction gear ratio. Thus, the casing 9 is rotated.

Figure 10:
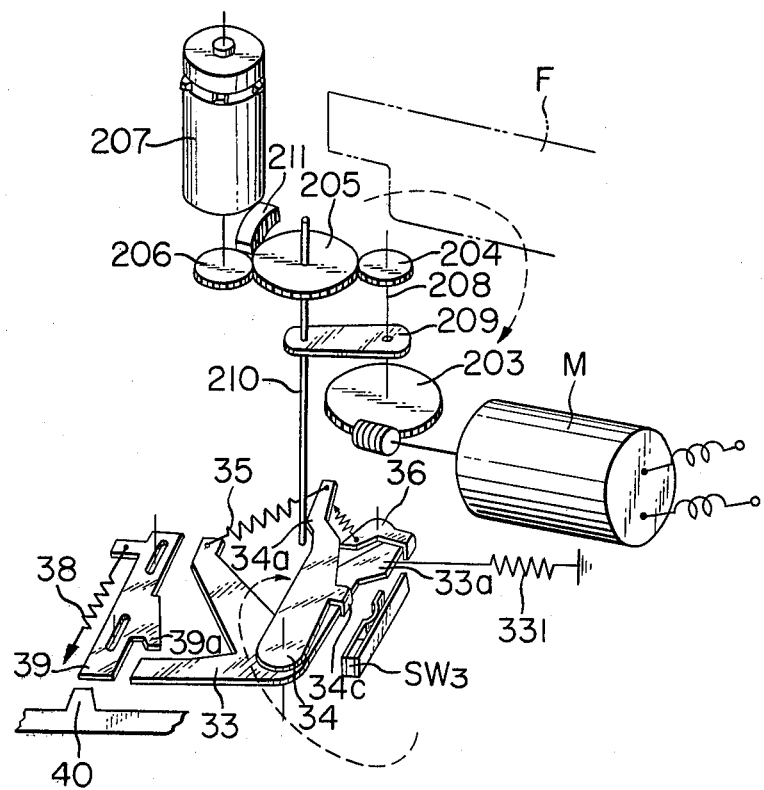
FIG. 10 is a perspective view of another embodiment of the present invention.

FIG. 10 shows another embodiment of the present invention in which the motor and the take-up spool are provided separately from each other. In FIG. 10, elements identical to those of FIG. 2 are given similar reference characters and the wind-up devices (3, 20, etc.) are omitted. The electric circuit in this embodiment is the same as that of FIG. 6.

The rotation of the motor M is transmitted through gears 202, 203, 204 to an idle gear 205 and is further transmitted through a gear 206 to a takeup spool 207. A carrier 209 is loosely fitted on the shaft 208 of the gears 203, 204, and a shaft 210 rotatably supporting the idle gear 205 is secured to the carrier 209. This shaft 210 is engageable with the projection 34a of the torque detecting lever 34. A gear 211 can mesh with the idle gear 205. Now, in FIG. 10 which shows the closed position of the back lid, when a worm gear 202 is clockwisely rotated by the motor M, the idle gear 205 is counter-clockwisely rotated through the agency of the gears 203 and 204. By this, the take-up spool 207 is clockwisely rotated to take up the film F as it remains unexposed. When the preparatory wind-up of the film is terminated, the spool 207 stops rotating and therefore, the rotational torque exerted on the idle gear 205 through the gear 204 is increased. When this torque exceeds a predetermined value, the idle gear 205 becomes disengaged from the gear 206 and is clockwisely rotated about the shaft 208 and further comes into mesh engagement with a gear 211. That is, the idle gear 205 constitutes a planet gear having the gear 204 as the sun gear.

Now, the carrier 209 is also rotated clockwisely about the shaft 208 by the planetary rotation of the idle gear 205 and therefore, the shaft 210 causes the projection 34a to rotate the torque detecting lever 34 clockwisely. By this, the restraining lever 36 is counter-clockwisely rotated to release the restraint of the lever 33 and therefore, due to the restitution force of the spring 331, the lever 33 and the torque detecting lever 34 restore the same positions as those shown in FIG. 5. In the course of rotation of the lever 33, the torque detecting switch $SW_3$ becomes open to cut off the power supply circuit to the motor M, which thus stops rotating. At this time, the take-up spool 207 is liberated from the gear 205 and is free to rotate.

The second mesh engagement between the gears 205 and 206 is accomplished by the back lid being opened after termination of the photography and the levers 33, 34 restoring their positions shown in FIG. 10 with the aid of the action of the spring 38 and lever 39, subsequently a new film magazine being loaded, and then the back lid being closed and the motor M again rotating to thereby rotate the gear 205, the carrier 209 and the shaft 210 clockwisely about the shaft 208 while following the locus indicated by the broken line in FIG. 10. When the gear 206 has come into mesh engagement with the idle gear 205, the shaft 210 comes into engagement with the projection 34a of the torque detecting lever 34 and as a result, the take-up spool 207 rotates in the same manner as previously described.

The position in which the torque detecting lever 34 has been retracted from the locus of the pin 41a is maintained by the springs 35 and 331 and therefore, during the wind-up for photography, the take-up spool can freely rotate independently of the drive force of the motor. Thus, no special operation is required for the shift from the preparatory wind-up to the wind-up state and in addition, the load imparted from the preparatory wind-up device to the wind-up device through the film during the wind-up for photography can be reduced.

In the embodiments so far described, the lever 33 is constructed so as to charge the spring 331 or 30 in response to the opening of the back lid 40, but the same effect can also be obtained by manually moving the lever 33.

Figure 11:
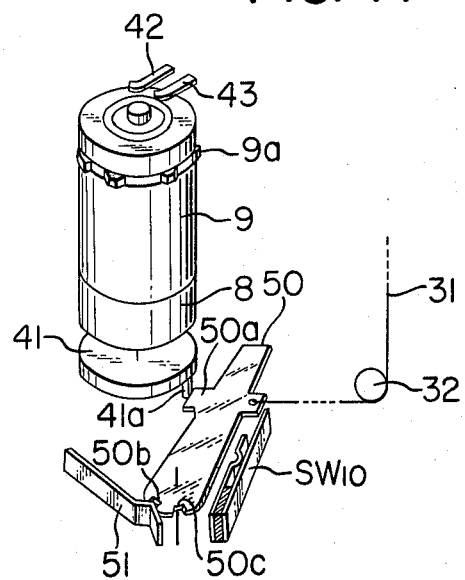
FIG. 11 is a perspective view of still another embodiment of the present invention.
Figure 12:
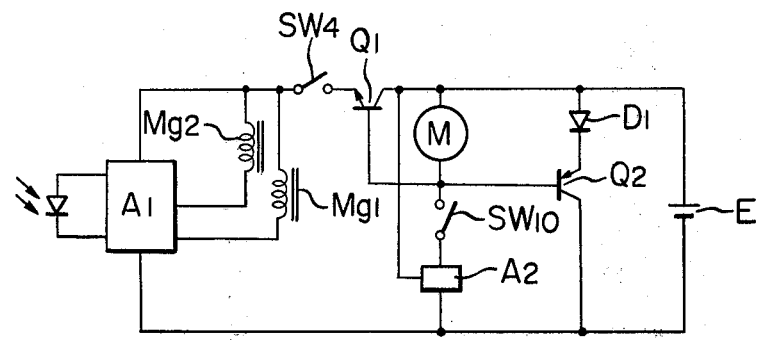
FIG. 12 is a diagram of the electric circuit for the embodiment of FIG. 11.

FIG. 11 shows still another embodiment of the present invention, and FIG. 12 diagrammatically shows the electric circuit for this embodiment. Members similar in function to those of the above-described embodiments are given similar reference characters and need not be described.

In FIG. 11, a lever 50 is rotatable by manual operation between a position in which the projection 50a thereof comes into the rotational orbit of the pin 41a of the torque plate 41 and a position in which said projection 50a is retracted from such orbit. Cut-aways 50b, 50c and plate spring 51 together constitute a click mechanism for restraining the lever 50 in the two positions. The cord 31 of FIG. 2 is connected to the lever 50 and, when the lever 50 is turned leftwardly, the connection between the gear 23 and the gear 22 is released while, at the same time, the mesh engagement between the gear 23 and the gears 27, 28 is released. A switch $SW_{10}$ is closed when the projection 50a of the lever 50 has come into the orbit of the pin 41a, and is opened when the projection 50a has been retracted from said orbit.

In FIG. 12, the switch $SW_{10}$ is connected in the power supply circuit of the motor M. A motor current detecting circuit $A_2$ series-connected to the switch $SW_{10}$ serves to detect the increase in motor current occurring at the termination of the preparatory wind-up, and opens the power supply circuit of the motor when the motor current exceeds a predetermined value.

Operation will now be described. A film magazine is loaded into the camera, the film is placed on the take-up spool 9 and the back lid is closed. Thereafter, when the lever 50 is turned leftwardly, the switch $SW_{10}$ is closed and the projection 50a comes into the orbit of the pin 41a (this is the position of FIG. 11). By the closing of the switch $SW_{10}$, the motor M is supplied with power and, in the same manner as previously described, the casing 9 is rotated by the engagement between the projection 50a and the pin 41a to take up the unexposed film. Thus, the preparatory wind-up is accomplished. Of course, since the clutch is disengaged, the sprocket 29 and the drive coupling 27 are freely rotating. At this time, transistor $Q_1$ is in its OFF state to prevent the electromagnetic release and transistor $Q_2$ is in its ON state to display that the preparatory wind-up is going on.

When all of the film has been taken up, the load of the motor M increases and therefore, the motor current also increases. When it detects that the motor current has exceeded a predetermined value, the motor current detecting circuit $A_2$ opens the power supply circuit of the motor, thus stopping the motor. At this time, the transistor $Q_1$ is turned on to enable the electromagnetic release and the subsequent exposure control, and the transistor $Q_2$ is turned off to turn off the light-emitting diode $D_1$, thus informing of the termination of the preparatory wind-up.

When the lever 50 is turned rightwardly after the light-emitting diode $D_1$ has been turned off, the projection 50a is retracted from the orbit of the pin 41a and at the same time, the gear 23 connected by the cord 31 becomes capable of transmitting the rotation of the wind-up lever 3 to the sprocket 29 and the drive coupling 27 due to the return of the spring 30. Accordingly, by operating the film advance lever 3, it becomes possible to effect photography while winding the film into the magazine.

The above-described embodiments are constructed such that switch means is used to prevent the power supply to the motor in order to prevent the shutter release before the termination of the preparatory wind-up, but such construction may be replaced by a construction in which the operation of the shutter release button is prevented or the prevention is released, for example, by the lever 33 which is displaced before and after the termination of the preparatory wind-up.

The present invention is not restricted to the above-described embodiments, but a construction may also be adopted which is provided with a gear train disposed, for example, between the motor and the take-up spool, a clutch making and breaking the transmission of the motor drive force to part of the gear train and adapted to assume a first position during the preparatory wind-up to transmit the drive force and to assume a second position during the wind-up to cut off the drive force, a spring for biasing the clutch to its second position when it is in its first position, a restraining member for restraining the clutch in its first position in spite of the bias of the spring, a circuit for detecting the current flowing to the motor, and an electromagnetic device for releasing the restraint of the restraining member when it has been detected by the detecting circuit that the motor current has exceeded a predetermined value as a result of the fact that upon termination of the preparatory wind-up, the film cannot be taken up any further and the motor load has increased, whereby the relation between the motor and the take-up spool is cut off by the release of the restraint.

We claim:

1. In a film feeding device for a camera including a preparatory wind-up device for winding up on a supply spool, before exposure, a roll film in a film magazine loaded into the camera, and a second wind-up device for rewinding into said magazine the film wound on said supply spool, said second wind-up device being capable of controlling the frame by frame movement of said film in cooperation with an operation for effecting exposure of said film by a shutter device, the improvement comprising:

(a) means for detecting the completion of the wind-up, by said preparatory wind-up device, of all of the film which is drawn out of said film magazine and can be wound up on said supply spool; and (b) change-over means for blocking and releasing the operation of said shutter device, said change-over means being operatively associated with said detecting means to block said operation before said detecting means detects the completion of the wind-up of said film and to release said blocking when said detecting means has detected said completion, said shutter device including an electromagnet energized to effect said operation for exposure, a circuit for supplying the energy to said electromagnet, and switch means for controlling said circuit, said switch means being operated in response to said detecting means.

2. In a film feeding device for a camera including a preparatory wind-up device for winding up on a supply spool, before exposure, a roll film in a film magazine loaded into the camera, and a second wind-up device for rewinding into said magazine the film wound on said supply spool, said second wind-up device being capable of controlling the frame by frame movement of said film in cooperation with an operation for effecting exposure of said film by a shutter device, the improvement comprising:

(a) means for detecting the completion of the wind-up, by said preparatory wind-up device, of all of the film which is drawn out of said film magazine and can be wound up on said supply spool;

(b) change-over means for blocking and releasing the operation of said shutter device, said change-over means being operatively associated with said detecting means to block said operation before said detecting means detects the completion of the wind-up of said film and to release said blocking when said detecting means has detected said completion; an electric motor for driving said supply spool, and (c) a power supply circuit to said electric motor, said power supply circuit including means operatively associated with said detecting means to stop the power supply upon detection of the completion of the wind-up of the film by said detecting means.

3. A film feeding device according to claim 1 or 2, further including:

another change-over means for blocking and releasing the operation of said second wind-up device, said another change-over means being operatively associated with said detecting means to block said operation before said detecting means detects the completion of the wind-up of said film and to release said blocking when said detecting means has detected said completion.

4. A film feeding device according to claim 3, wherein said magazine is provided with a film rewind shaft, said second wind-up device has operating means for driving said film rewind shaft, and said another change-over means includes clutch means provided between said operating means and said film rewind shaft.

5. A film feeding device according to claim 2, wherein said camera is provided with a back lid opened and closed to load said film magazine into the camera, and said power supply circuit further includes means for starting the power supply in response to the closing of said back lid.

6. A film feeding device according to claim 2, further including means for detecting the loading of said film magazine into the camera and wherein said power supply circuit includes means operatively associated with said loading detecting means to control the power supply.

7. A film feeding device according to claim 1 or 2, wherein said detecting means detects an increase in tension of the film occurring at said completion of the wind-up.

8. A film feeding device according to claim 7, wherein said detecting means includes means for detecting the rotational torque of said supply spool.

* * * * *